United States Patent
Kawai et al.

(10) Patent No.: US 7,815,448 B2
(45) Date of Patent: Oct. 19, 2010

(54) SERVICE PLUG

(75) Inventors: Nobuyuki Kawai, Okazaki (JP); Ryoji Taneda, Okazaki (JP)

(73) Assignees: Mitsubishi Jidosha Kogyo Kabushiki Kaisha, Tokyo (JP); Mitsubishi Jidosha Engineering Kabushiki Kaisha, Aichi (JP)

( * ) Notice: Subject to any disclaimer, the term of this patent is extended or adjusted under 35 U.S.C. 154(b) by 0 days.

(21) Appl. No.: 12/343,809

(22) Filed: Dec. 24, 2008

(65) Prior Publication Data

US 2009/0197456 A1 Aug. 6, 2009

(30) Foreign Application Priority Data

Jan. 31, 2008 (JP) .............................. 2008-021614

(51) Int. Cl.
*H01R 13/62* (2006.01)

(52) U.S. Cl. .................... 439/159; 439/680; 439/157

(58) Field of Classification Search ............... 439/157, 439/159, 680
See application file for complete search history.

(56) References Cited

U.S. PATENT DOCUMENTS

| | | | | |
|---|---|---|---|---|
| 5,360,351 | A | * | 11/1994 | Periou et al. ................. 439/357 |
| 5,711,682 | A | * | 1/1998 | Maejima ...................... 439/157 |
| 5,771,575 | A | * | 6/1998 | Onizuka et al. ............... 29/868 |
| 5,971,801 | A | * | 10/1999 | Kato et al. .................... 439/511 |
| 5,992,946 | A | * | 11/1999 | Bayer et al. ................... 303/113.1 |
| 6,196,858 | B1 | | 3/2001 | Matsumoto et al. |
| 6,293,813 | B1 | * | 9/2001 | Johnston et al. .............. 439/157 |
| 6,325,647 | B1 | * | 12/2001 | May et al. ..................... 439/157 |
| 6,644,991 | B2 | * | 11/2003 | Martin .......................... 439/157 |
| 6,695,378 | B2 | * | 2/2004 | Hanagan ....................... 296/65.01 |
| 6,994,559 | B1 | * | 2/2006 | Sanftleben .................... 439/34 |
| 7,012,533 | B2 | * | 3/2006 | Younse ......................... 340/573.1 |
| 7,270,045 | B1 | * | 9/2007 | Gonzalez ...................... 89/36.02 |
| 7,438,589 | B1 | * | 10/2008 | Fleury et al. .................. 439/490 |
| 2006/0228919 | A1 | | 10/2006 | Marukawa et al. |

FOREIGN PATENT DOCUMENTS

| | | |
|---|---|---|
| EP | 1282201 A | 2/2003 |
| JP | 9-226483 A | 9/1997 |
| JP | 10-144429 A | 5/1998 |
| JP | 2003-017198 A | 1/2003 |
| JP | 2003-341373 A | 12/2003 |
| JP | 2006-103628 A | 4/2006 |
| JP | 2006/327251 A | 12/2006 |

* cited by examiner

*Primary Examiner*—Truc T Nguyen
(74) *Attorney, Agent, or Firm*—Birch, Stewart, Kolasch & Birch, LLP

(57) ABSTRACT

A service plug includes: a base member in which a circuit terminal adapted to be connected to an electric circuit is provided and an open hole is formed in such a manner as to face the circuit terminal; a plug body comprising a short-circuit terminal adapted to be inserted into the circuit terminal; and a restricting member provided in the vicinity of the open hole of the base member for restricting movement of the plug body in a direction which intersects an inserting direction of the short-circuit terminal.

11 Claims, 6 Drawing Sheets

SERVICE PLUG

BACKGROUND OF THE INVENTION

1. Field of the Invention

The present invention relates to a service plug which opens an electric circuit to cut off the circuit.

2. Description of the Related Art

Electric vehicles have been considered more and more as means for reducing exhaust gas discharged from vehicles with internal combustion engines to the environment. Since an electric vehicle obtains its driving force by driving electric motors, a battery constituting an electric power supply is installed in the electric vehicle. A high voltage circuit includes the battery, and since it is heavy, the battery is stored under the floor of the vehicle to thereby help lower the center of gravity of the vehicle. In the electric vehicle, in servicing the vehicle for maintenance, the high voltage circuit needs to be cut off in order to prevent a mechanic from being subjected to an electric shock. Because of this, a service plug for cutting off the high voltage circuit is provided on the electric vehicle. Namely, in the high voltage circuit including the battery, by a short-circuit plug body being inserted into a base member of the service plug when the electric vehicle is in use, the high voltage circuit is established, whereas by the plug body being removed from the base member when the electric vehicle is serviced for maintenance, the circuit is opened, whereby the high voltage circuit is made to be cut off.

A short-circuit terminal is provided on the plug body, and the plug body is fitted in the base member side so that the short-circuit terminal is inserted into a circuit terminal provided on a vehicle body, whereby the high voltage circuit is put into a short-circuited state. When cutting off the high voltage circuit, for example, at the time of servicing the electric vehicle for maintenance, the plug body is removed so that the short-circuit terminal is removed from the circuit terminal. After the maintenance service of the vehicle has been completed, the plug body is fitted back into the base member so that the high voltage circuit is restored from the cut-off state.

Normally, the plug body of the service plug stays fitted in the base member, and an easy removal of the plug body from the base member has to be avoided. Because of this, the service plug is installed in a position which can easily be accessed from an interior of the vehicle body (a position where the service plug cannot be removed from the outside of the vehicle body) and which becomes invisible from occupants of the vehicle. In the case of the battery being installed underneath the floor, the service plug is installed on the floor panel side under a seat cushion, and when the plug body has to be detached and attached back for maintenance service or the like, necessary work is performed within a space defined under the seat cushion.

Since the detachment and attachment of the service plug requires necessary work to be carried out within the limited space, good workability has been desired, and this is particularly true in inserting the plug body back into the base member. Because of this, there has been proposed a service plug in which a pair of guide walls are provided on a surface of a case member on a circuit terminal side in such a manner as to project therefrom in a confronting fashion, a guide groove extending in an inserting direction of a plug body (an inserting direction of a short-circuit terminal) is formed on each of the guide walls, a boss portion of the plug body is positioned from above the guide grooves, and the plug body is inserted along the guide grooves from above the guide walls (for example, refer to JP-A-10-144429).

In the related-art service plug, since the position of the plug body is restricted by the pair of guide walls, the plug body can be positioned properly relative to the base member even in a space defined under a seat cushion and made difficult to be visualized, thereby making it possible to insert the short-circuit terminal in the circuit terminal well.

In the related-art service plug, since the plug body needs to be moved to the position of the guide walls which lies upwards in the inserting direction of the short-circuit terminal, a gap which is equal to or larger than what results from the addition of a height of the guide walls and a height of the plug body becomes necessary between the floor panel and a lower surface of the seat cushion. Because of this, the related-art service plug cannot be used in a narrow gap or space, and in the event that the service plug is installed under the seat cushion, the related-art service plug can currently be used only on a limited number of model lines. Although the service plug can be installed in the limited space by reducing the height of the guide walls, the restriction of the plug body becomes insufficient, and hence, the short-circuit terminal cannot be inserted well in the circuit terminal.

SUMMARY OF THE INVENTION

It is therefore an object of the invention to provide a service plug which can attain the attachment and detachment of a plug body to and from a base member in an easy and good way even in a space which is difficult to be visualized and is narrow.

In order to achieve the object, according to the invention, there is provided a service plug comprising:

a base member in which a circuit terminal adapted to be connected to an electric circuit is provided and an open hole is formed in such a manner as to face the circuit terminal;

a plug body having a short-circuit terminal adapted to be inserted into the circuit terminal; and a restricting member provided in the vicinity of the open hole of the base member for restricting movement of the plug body in a direction which intersects an inserting direction of the short-circuit terminal.

A guide member may be provided on an opposite side of the restricting member across the open hole and on a circuit terminal side of the open hole for guiding the plug body in the inserting direction.

The electric circuit may be made up of a vehicle battery, the vehicle battery may be stored at a lower portion of a floor panel lying under a seat cushion, and the base member may be disposed in a service hole portion in the floor panel in such a state that the open hole is oriented towards a lower surface of the seat cushion.

The open hole may have a cylindrical shape which projects from a surface of the base member, a circumferential wall portion having the same height as that of the cylindrical portion of the open hole may be provided on the base member along a circumference of the open hole, the restricting member may be formed contiguously to the circumferential wall portion in such a manner as to extend higher in a height direction than the circumferential wall portion, and the guide member may be a groove which is formed on an inner wall of the circumferential wall portion in such a manner as to extend in the height direction so that a boss portion of the plug body is slidably fitted therein.

The restricting member may have a curved surface whose shape matches an external shape of the plug body, and the restricting member may restrict the movement of the plug body in a plane to which the plug body is inserted from a direction which is parallel to the lower surface of the seat cushion and allows the plug body to rotate along the curved surface of the restricting member in the plane to thereby allow the boss portion to be fitted in the groove.

A lever may be provided rotatably on the plug body, and the lever may include a cam mechanism for causing the plug body to move along the guide member so that the short-circuit terminal is inserted into the circuit terminal in response to rotation of the lever which is rotated in such a state that the plug body is positioned by the restricting member and the guide member.

DETAILED DESCRIPTION OF THE INVENTION

Figure 1:
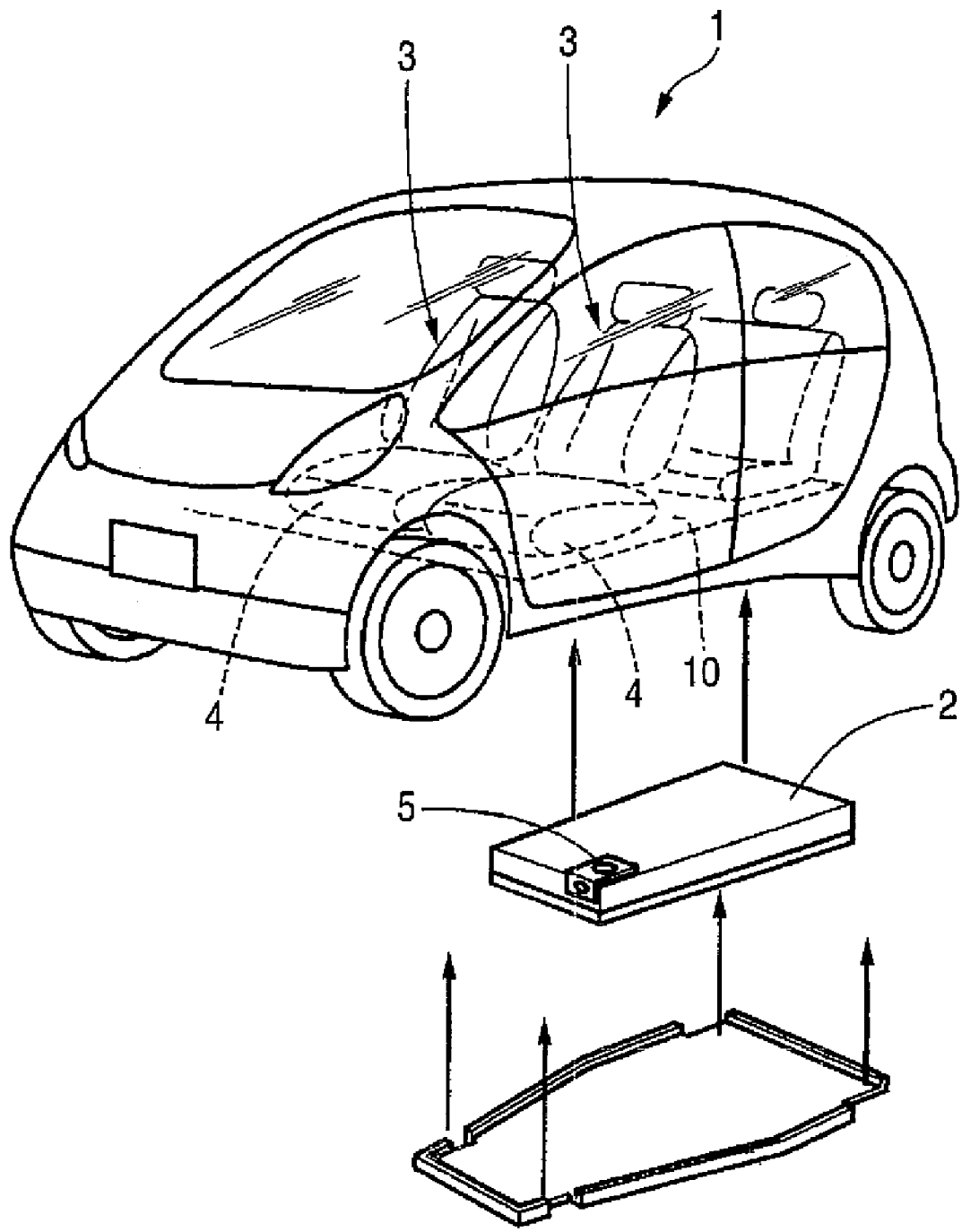
FIG. 1 is an external view of an electric vehicle which is provided with a service plug according to an embodiment of the invention.
Figure 2:
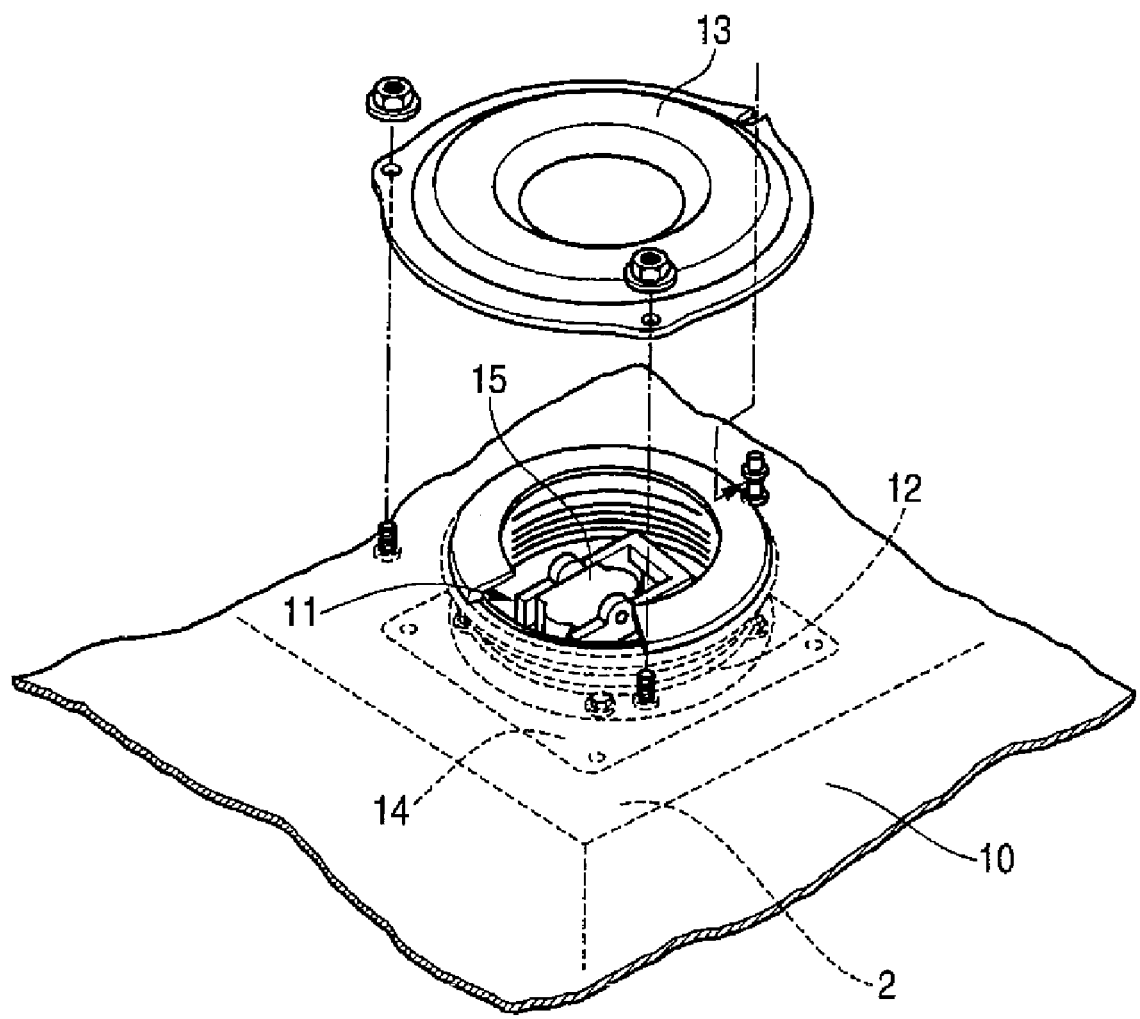
FIG. 2 is an external view of a location where a service plug is installed.

As is shown in FIG. 1, a battery case 2 is attached to a lower frame (whose illustration is omitted) of an electric vehicle 1, and the battery case 2 is covered by a floor panel 10 and constitutes a floor member. Seats 3 are supported on the floor panel 10, and a service hole portion 5 for use in servicing the electric vehicle 1 for maintenance is formed in the floor panel 10 (the battery case 2) under a seat cushion 4 of a front seat 3. A plurality of battery cells are stored in an interior of the battery case 2, and by electrically connecting the plurality of battery cells so stored a high voltage circuit is formed which constitutes a power source for driving the electric vehicle 1.

As is shown in FIGS. 2 to 5, a service plug 11 is provided in a position where the service hole portion 5 is provided, and the service hole portion 5 is covered by a waterproof boot member 12 around a circumference of the service plug 11, an upper surface of the floor panel 10 being closed by a lid 13. Although details will be described later, the service plug 11 is made up of a base member 14 and a plug body 15 which is fitted in the base member 14. Two open holes 21 are formed in the base member 14, and circuit terminals 22 of a high voltage circuit are made to face opposing the open holes 21 so formed. In addition, two short-circuit terminals 23 are formed in the plug body 15 for insertion into the circuit terminals 22.

By the plug body 15 being fitted in the base member 14, the two short-circuit terminals 23 are inserted into the two circuit terminals 22 to thereby bring the high voltage circuit into a closed state (an energized state), whereas when the plug body 15 is removed from the base member 14 with the lid 13 removed for servicing the vehicle for maintenance, the two short-circuit terminals 23 are removed from the two circuit terminals 22 to thereby bring the high voltage circuit into an open state (a cut-off state), whereby a mechanic in charge can be prevented from being subjected to an electric shock.

Figure 3:
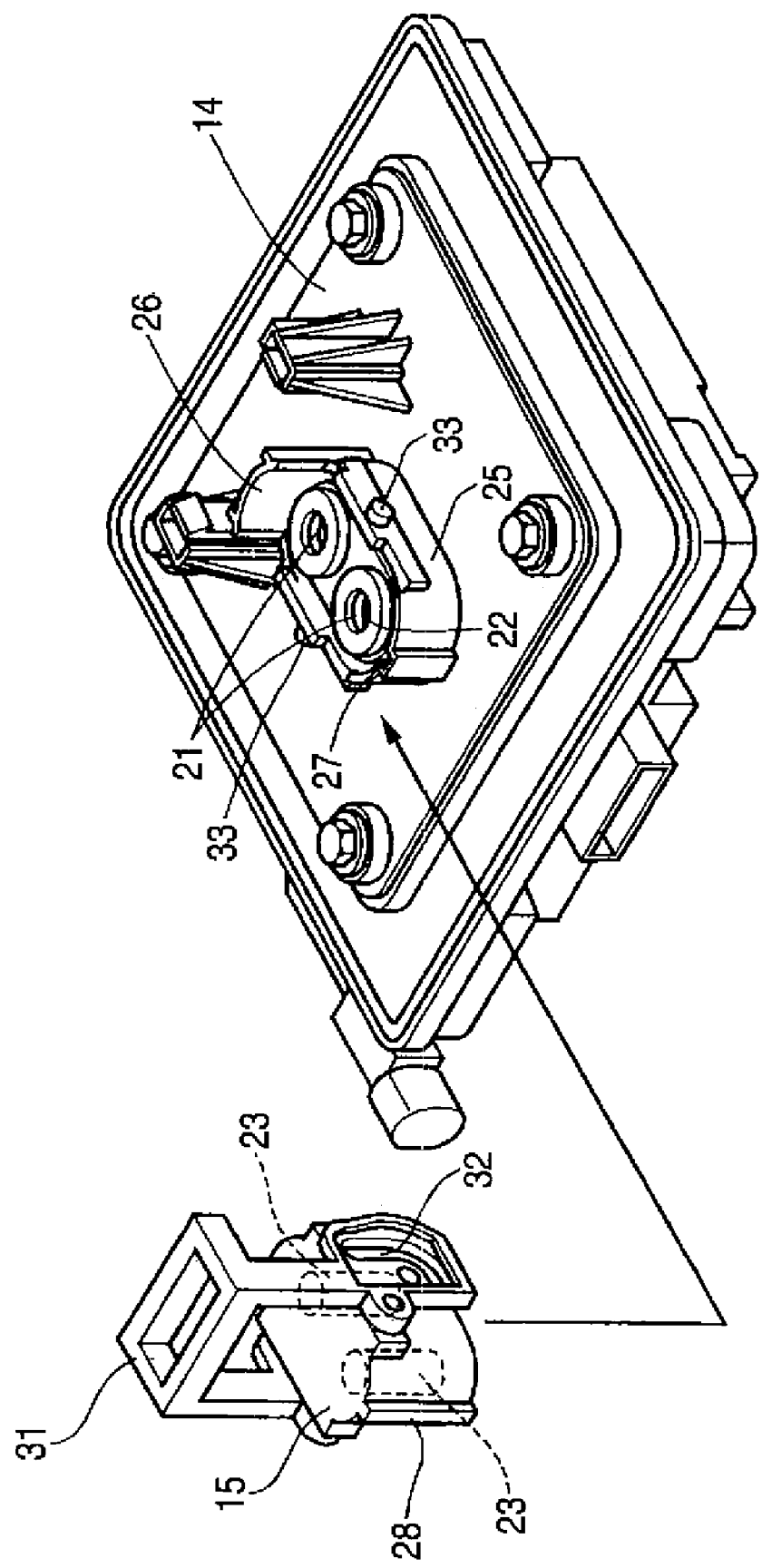
FIG. 3 is an exploded perspective view of the service plug.
Figure 4:
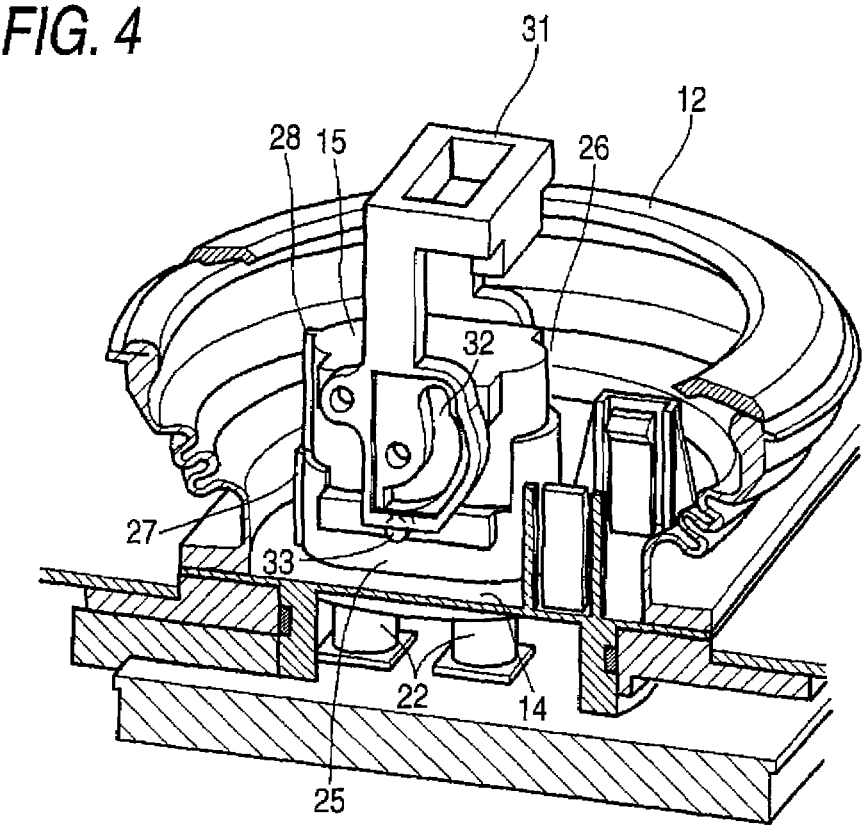
FIG. 4 is an external view of a state in which a plug body is positioned (is aligned with a base member).
Figure 5:
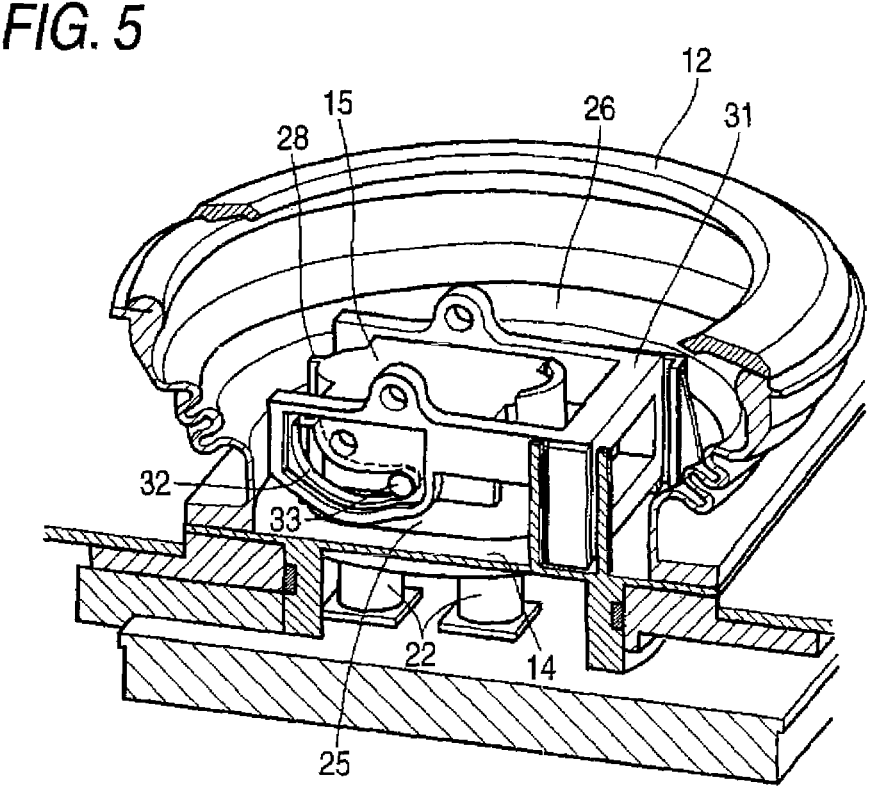
FIG. 5 is an external view of a state in which the plug body is inserted and fixed to the base member.

The service plug will specifically be described based on FIGS. 3 to 5.

The base member 14 is fixed to a location on the battery case where the circuit terminals 22 are exposed to face the base member 14 when it is so placed, and the two open holes 21 are formed in the base member 14 in such a manner as to be associated with the two circuit terminals 22, respectively. The open holes 21 are formed into cylindrical shapes which project from a surface of the base member 14, and the circuit terminals 22 (for example, female terminals) are disposed, respectively, in corresponding cylindrical portions of the open holes 21. A circumferential wall portion 25 having the same height as that of the cylindrical portions of the open holes 21 is provided on the base member 14 in such a manner as to extend along circumferences of the open holes 21, and the circumferential wall portion 25 is formed into an oval shape in which a pair of straight surfaces are connected by arc-shaped surfaces at both ends thereof as viewed from the top.

A restricting member 26 is provided at one of the arc-shaped portions of the circumferential wall portion 25 in such a manner as to erect therefrom into an arc shape, and the restricting member 26 is formed contiguously to the circumferential wall portion 25 in such a manner as to extend higher in a height direction than the circumferential wall portion 25. An inner wall of the restricting member 26 is formed into a curved surface which matches the arc shape of the portion where the restricting member 26 is provided. A groove 27 is formed on an inner wall of the other arc-shaped portion of the circumferential wall portion 25 in such a manner as to extend along an overall height of the circumferential wall portion 25, and a guide member is made up by the groove 27.

The plug body 15 is made up of an oval hollow member which is next smaller than the circumferential wall portion 25, and the two short-circuit terminals 23 (male terminals) are provided in an interior of the plug body 15. The plug body 15 is fitted (inserted) in an inside of the circumferential wall portion 25 (along an axial direction of the cylindrical portions of the open holes 21) to thereby be fitted in the base member 14, whereby the two short-circuit terminals 23 are inserted into the two circuit terminals 22, respectively. Namely, by causing the plug body 15 to move in the axial direction of the cylindrical portions of the open holes 21, the plug body 15 is fitted in the circumferential wall portion 25, whereby the two short-circuit terminals 23 are inserted into the two circuit terminals 22, respectively, to thereby bring the high voltage circuit into a closed state.

An outer wall of one of arc-shaped end portions of the plug body 15 is formed into a curved surface which matches the shape of the inner wall of the restricting member 26, and a boss portion 28 is formed on an outer wall of the other arc-shaped end portion of the plug body 15. By the outer wall of the one of the arc-shaped end portions of the plug body 15 being brought into abutment with the inner wall of the restricting member 26 for positioning (alignment), the boss portion 28 on the outer wall of the other arc-shaped end portion is fitted in the groove 27 on the inner wall of the circumferential wall portion 25, whereby the plug body 15 is guided along the groove 27. Namely, the two short-circuit terminals 23 are positioned relative to the two circuit terminals 22, whereby the insertion of the short-circuit terminals 23 into the circuit terminals 22 is guided.

In addition, in the embodiment that has been described heretofore, while the restricting member 26 is formed into the arc-shaped wall with the inner wall thereof formed into the curved surface shape, the inner wall can be made into, for example, a dihedral or polyhedral shape, provided that the restricting member 26 is formed contiguously to the circumferential wall portion in such a manner as to extend higher in the height direction than the circumferential wall portion and the inner wall is formed into the shape with which the outer wall of the one of the arc-shaped end portions of the plug body 15 can be brought into abutment for restriction of the position thereof.

On the other hand, a lever 31 is supported rotatably on the plug body 15, and a cam hole 32 is formed on the lever 31 as a cam mechanism. A cam pin 33 is formed on an outer wall of a side portion of the circumferential wall portion 25 of the base member 14 as a cam mechanism adapted to fit in the cam hole 32 when the plug body 15 is fitted in the inside of the circumferential wall portion 25. By causing the plug body 15 to fit in the base member 14, the cam pin 33 fits in the cam hole 32, and by rotating the lever 31 in a falling direction, the cam pin 33 moves relatively along the cam hole 32, whereby the plug body 15 moves in the axial direction of the cylindrical portions of the open holes 21 (in a direction along the groove 27 on the circumferential wall portion 25), and the short-circuit terminals 23 are fixed in place in such a state that the short-circuit terminals 23 are inserted into the circuit terminals 22, respectively.

The function of the attaching construction of the service plug 11 which is configured as has been described above will be described below.

In a normal state, the plug body 15 is fitted in the inside of the circumferential wall portion 25 and is fixed to the base member 14 by rotating the lever 31, whereby there is produced a state in which the two short-circuit terminals 23 are inserted into the two circuit terminals 22, respectively, and the high voltage circuit is put in the closed state. The location where the service plug 11 is provided lies under the seat cushion 4 and is covered by the lid 13, whereby the service plug 11 is kept inaccessible from the outside.

When cutting off the high voltage circuit for maintenance service or the like, the lid 13 is removed under the seat cushion 4, and the lever 31 is caused to rotate in an erecting direction so as to release the fixing of the plug body 15 to the base member 14. The plug body 15 is removed from the circumferential wall portion 25 of the base member 14, and the short-circuit terminals 23 are removed from the circuit terminals 22, whereby there is produced a state in which the high voltage circuit is opened (cut-off), allowing a mechanic in charge from being subjected to an electric shock.

Figure 6:
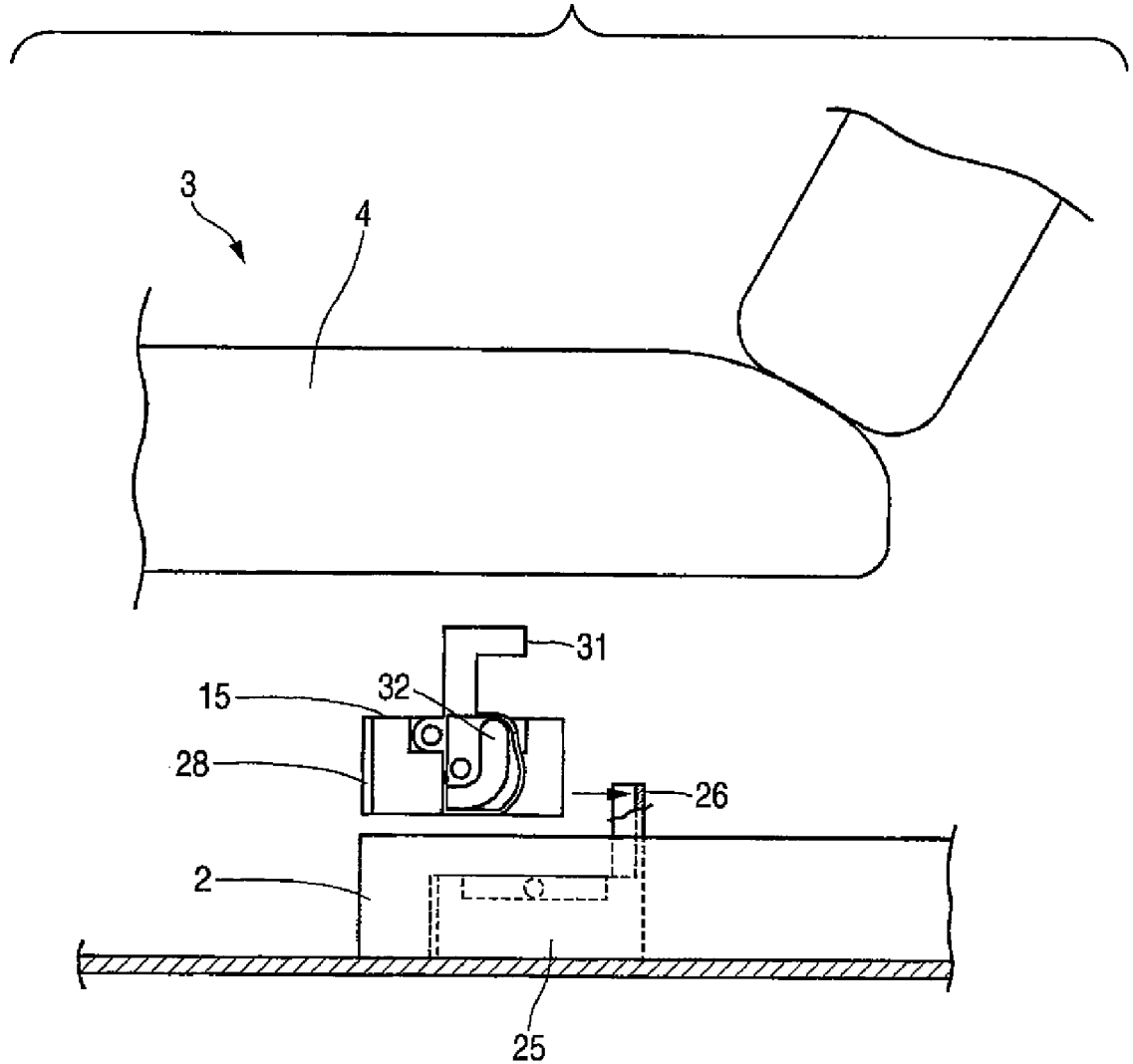
FIG. 6 is a side view representing a situation in which the plug body is positioned (is aligned with the base member).

When closing again the high voltage circuit after the completion of the maintenance service, the plug body 15 is fixed to the base member 14, and the two short-circuit terminals 23 are inserted back into the two circuit terminals 22, respectively. As is shown in FIG. 6, the location where the plug body 15 is fixed is an extremely narrow place under the seat cushion 4 of the seat 3. Because of this, it is difficult to visually confirm the movement and positioning of the plug body 15 relative to the base member 14.

Figure 7:
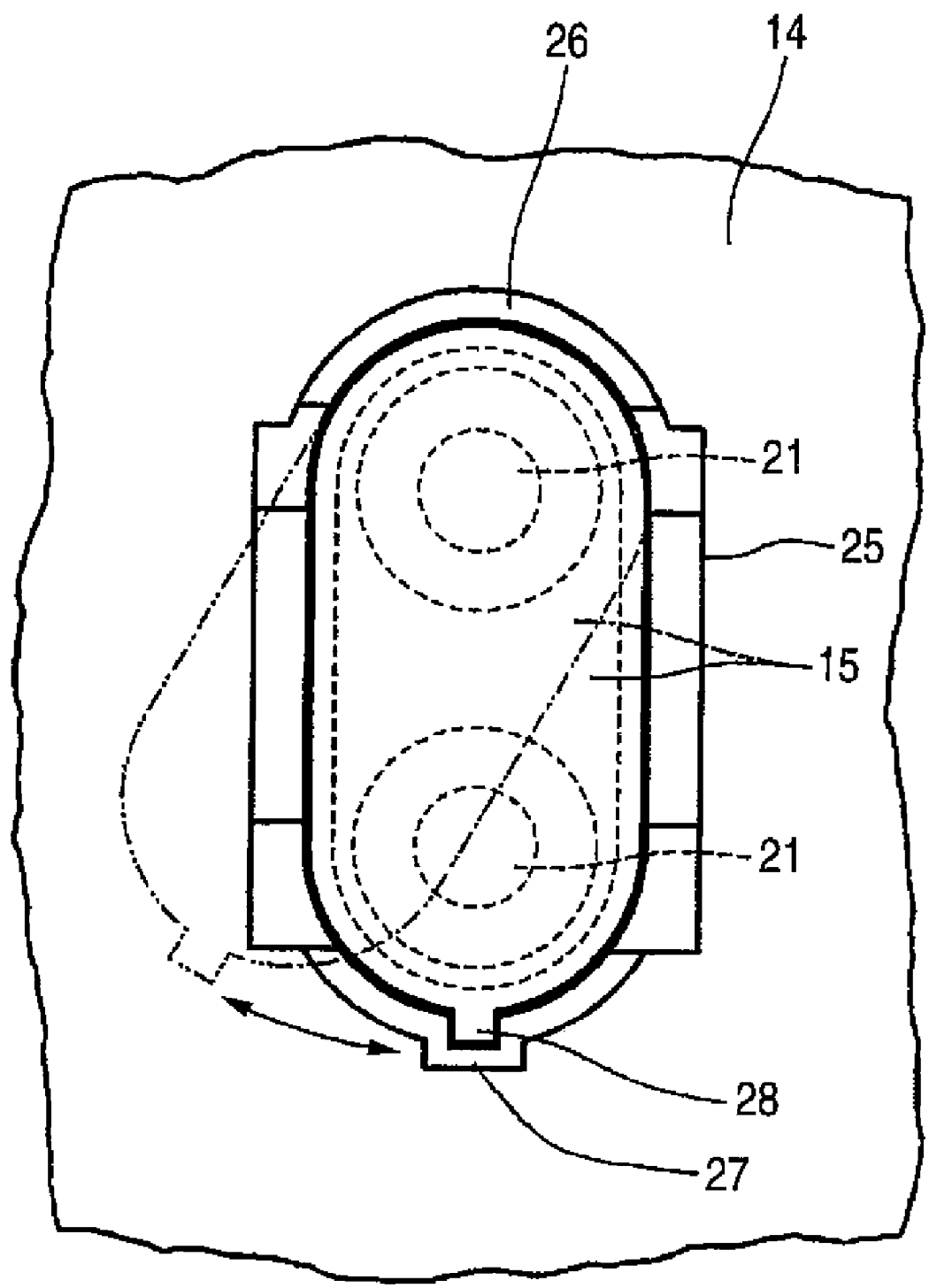
FIG. 7 is a plan view representing a situation in which the plug body is positioned (is aligned with the base member).

In the attaching construction that is configured as has been described above, the plug body 15 is caused to move within the plane which is parallel to the plane of the base member 14 between the seat cushion 4 and the floor panel 10 (in a direction indicated by an arrow in FIG. 6), and the arc-shaped outer wall of the plug body 15 is brought into abutment with the inner wall (the curved surface) of the restricting member 26 (a state indicated by broken lines in FIG. 7). Namely, the plug body 15 is caused to move in a direction which intersects the inserting direction of the short-circuit terminals 23. When the plug body 15 is caused to rotate about the inner wall (the curved surface) of the restricting member 26 within the plane which is parallel to the plane of the base member 14 in this state, the boss portion 28 of the plug body 15 is fitted in the groove 27 of the circumferential wall portion 25 as is indicated by a solid line in FIG. 7, whereby the two circuit terminals 22 are aligned with the two short-circuit terminals 23, respectively.

Because of this, the plug body 15 can be aligned with (be positioned with respect to) the base member 14 properly without causing the plug body 15 to move in the inserting direction of the short-circuit terminals 23 (the height direction) even in the extremely narrow place under the seat cushion 4 where space in the height direction is limited. Namely, the alignment of the plug body 15 with the base member 14 is enabled using the upper surfaces of the cylindrical portions of the open holes 21 of the base member 14 as base planes without causing the plug body 15 to move above the base planes.

Consequently, the alignment of the plug body 15 with the base member 14 is enabled easily by making the positions of the two circuit terminals 22 coincide with the positions of the two short-circuit terminals 23 even in the space defined between the seat cushion 4 and the floor panel 10 which is difficult to be visualized.

When the plug body 15 is aligned with the base member 14, the cam pin 33 on the circumferential wall portion 25 is allowed to fit in the cam hole 32 in the lever 31. The cam pin 33 moves relatively along the cam hole 32 by causing the lever 31 to rotate in the falling direction in this state, and the boss portion 28 is caused to move in the direction in which the short-circuit terminals 23 are inserted into the circuit terminals 22 while being guided by the groove 27 on the circumferential wall portion 25. By this action, the plug body 15 is fixed to the base member 14 in such a state that the two short-circuit terminals 23 are inserted in the two circuit terminals 22, respectively.

In the attaching construction of the service plug 11 which is configured as has been described above, the moving position of the plug body 15 is restricted with respect to the open holes 21 of the base member 14 by the restricting member 26 by the plug body 15 being caused to move in the direction which intersects the inserting direction of the short-circuit terminals 23. In addition, the plug body 15 is guided along the inserting direction of the short-circuit terminals 23 by the boss portion 28 being guided by the groove 27 on the circumferential wall portion 25, whereby the short-circuit terminals 23 on the plug body 15 are inserted into the circuit terminals 22, respectively.

Because of this, the plug body 15 can be attached to and detached from the base member 14 in an easy and good way even in the space as defined under the seat cushion 4 which is narrow with respect to the inserting direction of the short-circuit terminals 23 (the height direction) and is difficult to be visualized.

In addition, the plug body 15 can be fixed to the base member 14 in such a state that the short-circuit terminals 23 are inserted in the circuit terminals 22 via cam pin 33 and the cam hole 32 by the rotation of the lever 31.

In the embodiment that has been described heretofore, while the service plug 11 is described as being provided under the seat 3, that is, the service plug is described as being applied to the electric vehicle in which the battery cells (the battery) are stored under the floor surface below the seat 3, the application of the service plug of the invention is not limited to the application under the seat 3, and hence, the service plug of the invention can be applied to a case where the service plug is provided on the periphery of the seat 3 or in a narrow place on the periphery of a luggage compartment.

In addition, in the embodiment that has been described above, while the service plug is described as being applied to the service plug of the high voltage circuit which is made up of the battery installed in the electric vehicle, the service plug can also be applied to a service plug for a high voltage circuit which is made up of a battery of a hybrid vehicle or a fuel cell vehicle.

According to an aspect of the invention, by the plug body being caused to move in the direction which intersects the inserting direction of the short-circuit terminal, the moving position of the plug body is restricted relative to the open hole in the base member by the restricting member, and the short-circuit terminal of the plug body is inserted into the circuit terminal. Because of this, even in the event that the working space is limited or narrow relative to the inserting direction of the short-circuit terminal and is difficult to be visualized, the attachment and detachment of the plug body to and from the base member can be implemented in an easy and good way.

According to an aspect of the invention, the plug body is guided in the inserting direction of the short-circuit terminal by the guide member, whereby the short-circuit terminal of the plug body is inserted into the circuit terminal. Because of this, even in the event that the working space is limited or narrow relative to the inserting direction of the short-circuit terminal and is difficult to be visualized, the attachment and detachment of the plug body to and from the base member can be implemented in an easy and good way.

According to an aspect of the invention, even in the event that the service plug is disposed under the seat cushion, the plug body can be caused to move in a horizontal direction so as to be attached to and detached from the base member in an easy and good fashion.

According to an aspect of the invention, the plug body can be attached to and detached from the base member without causing the plug body to move to a position above a base plane which is made up by an upper surface of the cylindrical portion of the open hole.

According to an aspect of the invention, the short-circuit terminal and the circuit terminal can be positioned accurately by causing the plug body which is being restricted by the restricting member to rotate relative to the base member within the plane.

According to an aspect of the invention, the plug body can be made to be fitted in the base member in such a manner that the short-circuit terminal is inserted into the circuit terminal via the cam mechanism by rotating the lever after the plug body has been positioned relative to the base member.

According to the service plug of the invention, the attachment and detachment of the plug body to and from the base member can be attained in an easy and good way even in the event that the working space is limited and narrow and is difficult to be visualized.

The invention can be applied to the industrial field of the service plug for opening the electric circuit to cut off the circuit.

What is claimed is:

1. An attaching construction of a service plug, comprising:
a base member having an open hole that accommodates therein a circuit terminal adapted to be connected to an electric circuit; and
a plug body including a short-circuit terminal adapted to be inserted into the open hole, such that the short-circuit terminal is electrically connected to the circuit terminal;
wherein the base member is provided with a restricting member disposed in the vicinity of the open hole for restricting movement of the plug body in a direction which intersects an inserting direction of the short-circuit terminal, and a guide member for guiding the plug body in the inserting direction, and
wherein the restricting member projects in a height direction of the base member in such a manner as to be higher than the guide member, and
wherein the guide member is a groove formed on the base member.

2. The attaching construction of the service plug as set forth in claim 1, wherein
the base member is provided with the guide member on an opposite side of the restricting member across the open hole and on a circuit terminal side of the open hole.

3. The attaching construction of the service plug as set forth in claim 2, wherein
the electric circuit includes a vehicle battery,
the vehicle battery is stored at a lower portion of a floor panel lying under a seat cushion, and
the base member is disposed in a service hole portion in the floor panel in such a state that the open hole is oriented towards a lower surface of the seat cushion.

4. The attaching construction of the service plug as set forth in claim 3, wherein
the open hole has a cylindrical shape which projects from a surface of the base member, a circumferential wall portion of the base member having the same height as that of the cylindrical portion of the open hole and is provided along a circumference of the open hole,
the restricting member is formed contiguously to the circumferential wall portion in such a manner as to extend higher in the height direction, and
the groove is formed on an inner wall of the circumferential wall portion in such a manner as to extend in the height direction so that a boss portion of the plug body is slidably fitted therein.

5. The attaching construction of the service plug as set forth in claim 4, wherein
the restricting member has a curved surface having a shape that matches an external shape of the plug body, and
the restricting member restricts movement of the plug body in a plane to which the plug body is inserted from a direction which is parallel to the lower surface of the seat cushion and allows the plug body to rotate along the curved surface of the restricting member in the plane to thereby allow the boss portion to be fitted in the groove.

6. The attaching construction of the service plug as set forth in claim 5, wherein
a lever is provided rotatably on the plug body, and
the lever includes a cam mechanism for causing the plug body to move along the guide member so that the short-circuit terminal is inserted into the open hole in response to rotation of the lever which is rotated in such a state that the plug body is positioned by the restricting member and the guide member.

7. An attaching construction of a service plug, comprising:
a base member having an open hole that accommodates therein a circuit terminal adapted to be connected to an electric circuit; and
a plug body including a short-circuit terminal adapted to be inserted into the open hole, such that the short-circuit terminal is electrically connected to the circuit terminal;
wherein the base member is provided with a restricting member disposed in the vicinity of the open hole for restricting movement of the plug body in a direction which intersects an inserting direction of the short-circuit terminal, and a guide member for guiding the plug body in the inserting direction,
wherein the restricting member projects in a height direction of the base member in such a manner as to be higher than the guide member, and wherein the open hole has a cylindrical shape which projects from a surface of the base member, a circumferential wall portion of the base member having the same height as that of the cylindrical portion of the open hole and is provided along a circumference of the open hole, the restricting member is formed contiguously to the circumferential wall portion in such a manner as to extend higher in the height direction, and the guide member is a groove formed on an inner wall of the circumferential wall portion in such a manner as to extend in the height direction so that a boss portion of the plug body is slidably fitted therein.

8. The attaching construction of the service plug as set forth in claim 7, wherein the restricting member has a curved surface having a shape that matches an external shape of the plug body, and the restricting member restricts movement of the plug body in a plane to which the plug body is inserted from a direction which is parallel to the lower surface of the seat cushion and allows the plug body to rotate along the curved surface of the restricting member in the plane to thereby allow the boss portion to be fitted in the groove.

9. The attaching construction of the service plug as set forth in claim 8, wherein a lever is provided rotatably on the plug body, and the lever includes a cam mechanism for causing the plug body to move along the guide member so that the short-circuit terminal is inserted into the open hole in response to rotation of the lever which is rotated in such a state that the plug body is positioned by the restricting member and the guide member.

10. The attaching construction of the service plug as set forth in claim 7, wherein the base member is provided with the guide member on an opposite side of the restricting member across the open hole and on a circuit terminal side of the open hole.

11. The attaching construction of the service plug as set forth in claim 10, wherein the electric circuit includes a vehicle battery, the vehicle battery is stored at a lower portion of a floor panel lying under a seat cushion, and the base member is disposed in a service hole portion in the floor panel in such a state that the open hole is oriented towards a lower surface of the seat cushion.

* * * * *